United States Patent
Lin

(10) Patent No.: US 8,602,337 B2
(45) Date of Patent: Dec. 10, 2013

(54) CIRCULATING PROCESSOR

(76) Inventor: Wei-Chih Lin, New Taipei (TW)

( * ) Notice: Subject to any disclaimer, the term of this patent is extended or adjusted under 35 U.S.C. 154(b) by 129 days.

(21) Appl. No.: 13/432,893

(22) Filed: Mar. 28, 2012

(65) Prior Publication Data
US 2013/0256437 A1 Oct. 3, 2013

(51) Int. Cl.
*B02C 17/02* (2006.01)
*B02C 4/06* (2006.01)

(52) U.S. Cl.
USPC .................. 241/92; 241/282.1; 241/278.1

(58) Field of Classification Search
USPC .................... 241/92, 282.1, 285.2, 278.1
See application file for complete search history.

(56) References Cited

U.S. PATENT DOCUMENTS 3,044,514 A * 7/1962 Schnell ................... 241/56
3,313,332 A * 4/1967 Otto et al. ............... 241/98
5,727,742 A * 3/1998 Lawson ................... 241/199.12
7,673,824 B2 * 3/2010 Stamper et al. ......... 241/97

* cited by examiner

*Primary Examiner* — Faye Francis
(74) *Attorney, Agent, or Firm* — Muncy, Geissler, Olds & Lowe, PLLC

(57) ABSTRACT

A circulating processor includes a base, a container, a cutlery and a pressurizing mechanism. An operating motor is disposed in the base and is disposed with a mandrel therein. The container is disposed above the base, where a space is formed on its bottom part, and a reflux opening is formed on its upper half part and in communication with the space. The cutlery is positioned on the container's bottom part and connected to the mandrel. Thereby, when the operating motor operates, the mandrel and the cutlery are enabled to rotate synchronously, to mash food, vegetables and fruits in the container. The pressurizing mechanism is in communication with the space of the container. Through the pressurizing effect of the pressurizing mechanism, the mashed food, vegetables and fruits can be transferred into the container via the reflux opening, so as to perform circulating mashing treatment.

16 Claims, 2 Drawing Sheets

CIRCULATING PROCESSOR

BACKGROUND OF THE INVENTION

1. Field of Invention

The present invention relates to a processor, and more particularly to a circulating processor which may perform repeated mashing treatment on food, vegetables and fruits.

2. Related Art

With the progress of the times, especially the development of industry and commerce and the high development of earth, people need much more energy for their work, and yet get less and less physical exercises. As a result, they gradually feel degradation of their body functions that threats their health. The importance of exercise, hence are not only deeply recognized, but the demand for healthy diets becomes increasingly higher.

In terms of diet, nutritional balance is very important. In view of this, there have been various processors for vegetables, fruits and bean food, which are used to grind the food, vegetables and fruits and squeeze juice, in order that people can obtain nutritious supplements from them quickly. However, the principle of a common processor is to have food chopped and blended by cutting knives rotating at a high speed as driven by a carbon brush motor. In this case, high speed cutting requires high power consumption and introduces great noise, and after high speed cutting, nutrition in the food are rapidly oxidized and thereby lost; and after grinding, fibers, peels and seeds of the food cannot be easily decomposed into water-soluble fibers for being swallowed and absorbed by human bodies.

If the rotating speed of the processor is lowered, the above problems may be overcome, but the food, vegetables and fruits cannot be ground thoroughly. Therefore, a processor using upper and lower grinding pans that are opposite to each other to grind food, vegetables and fruits at a low speed has been provided. However, if the food, vegetables and fruits are processed by grinding only, the processing speed is relatively slow.

If the cutting knives and the grinding pans are assembled on the same processor, and the rotating speed of the motor is lowered, cutting and grinding may be performed sequentially, but as cutting and grinding are performed only once, the particles of the food, vegetables and fruits obtained after grinding are still too large to be absorbed by human bodies rapidly. If the juice of the food, vegetables and fruits after grinding is poured out and then cut and ground for another time, the particles and fibers of the food, vegetables and fruits can be made finer, but a lot of time is wasted and the nutrients are easily lost.

In view of the above, in order to alleviate the aforementioned disadvantages, and provide a circulating processor having a structure different from conventional processors and capable of performing repeated mashing treatment on food, vegetables and fruits to increase the efficiency and make particles and fibers of the mashed food, vegetables and fruits finer for being easily absorbed by human bodies, the present invention is made by the inventor through years of experience and continuous research, development and improvement.

SUMMARY OF THE INVENTION

An object of the present invention is to provide a circulating processor, which can perform repeated mashing treatment on food, vegetables and fruits, to improve the mashing efficiency.

Another object of the present invention is to provide a circulating processor, which can perform repeated cutting and grinding on food, vegetables and fruits, to improve the cutting and grinding efficiency, and to make the fibers of the ground food, vegetables and fruits finer for being easily absorbed by human bodies.

In order to achieve the above objects, the present invention provides a circulating processor, which includes a base, a container, a cutlery and a pressurizing mechanism. An operating motor is disposed in the base, and a mandrel is disposed in the operating motor; the container is disposed above the base, a space is formed on a bottom part of the container, a reflux opening is formed on an upper half part of the container, and the reflux opening is in communication with the space of the bottom part of the container; the cutlery is positioned on the bottom part of the container, connected to the mandrel of the operating motor, and used for rotating to mash food, vegetables and fruits placed inside the container; and the pressurizing mechanism is in communication with the space of the bottom part of the container, and used for pressurizing to transfer the mashed food, vegetables and fruits into the container via the reflux opening of the upper half part of the container, so as to perform circulating mashing treatment.

In implementation, the cutlery includes a cutting blade, a first millstone and a second millstone corresponding to the first millstone, the cutting blade, the second millstone and the mandrel are coaxially connected, and the cutting blade protrudes above the second millstone.

In implementation, the first millstone is annular-shaped, the first millstone is fixed to the bottom part of the container, a plurality of lower grinding teeth is disposed on an annular bottom surface of the first millstone, and a plurality of upper grinding teeth is disposed on a top surface of the second millstone corresponding to the plurality of lower grinding teeth.

In implementation, a handle is disposed on a side of the container, a channel is formed inside the handle, a top end of the channel is connected to the reflux opening of the upper half part of the container, and a bottom end of the channel is connected to the space of the bottom part of the container.

In implementation, a flow control valve is disposed on a side of the bottom part of the container, and the flow control valve is in communication with the space of the bottom part of the container, and used for controlling the space to be in communication with or separated from the outside of the container.

In implementation, the pressurizing mechanism is an upper conical plate formed below the cutlery and protruding downwards.

In implementation, the pressurizing mechanism further includes a lower conical plate located below the upper conical plate, and a space with a conical section is formed between a conical surface of the lower conical plate and a conical surface of the upper conical plate.

The following detailed description, given by way of examples or embodiments, will best be understood in conjunction with the accompanying drawings.

DETAILED DESCRIPTION OF THE INVENTION

Figure 1:
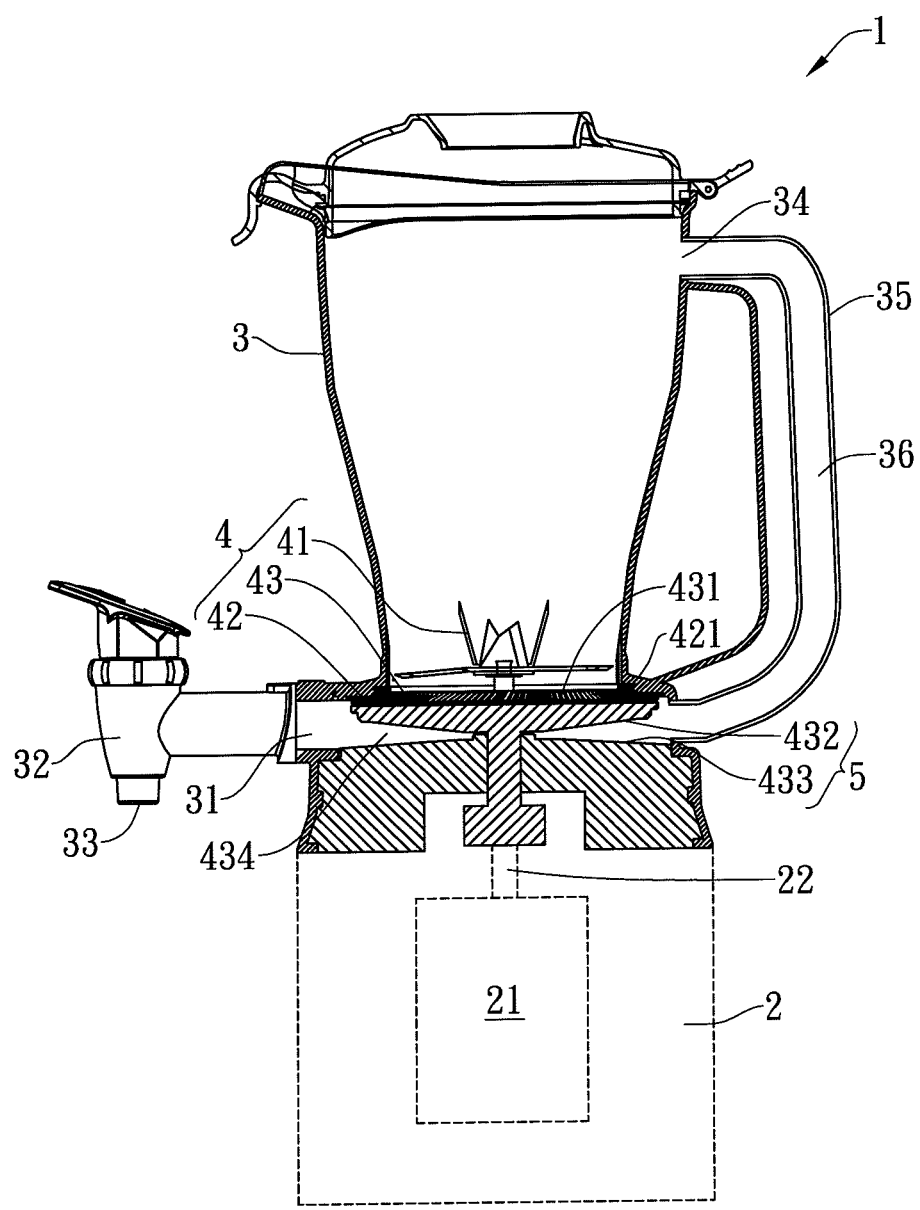
FIG. 1 is an assembled sectional view of a preferred embodiment of the present invention.

FIG. 1 shows a preferred embodiment of a circulating processor 1 of the present invention, which includes a base 2, a container 3, a cutlery 4 and a pressurizing mechanism 5.

The base 2 is substantially cylinder-shaped, having an operating motor 21 disposed therein, a mandrel 22 is disposed inside the operating motor 21, and a top end of the mandrel 22 protrudes upwards from a top part of the operating motor 21. In the implementation, the operating motor 21 is preferably a carbon-brush-free induction servo motor with a rotating speed lower than 6000 rpm, to drive the mandrel 22 to rotate at a low speed.

The container 3 is disposed above the base 2, a space 31 is formed on a bottom part of the container 3, a flow control valve 32 is disposed on a side of the bottom part of the container 3, the flow control valve 32 is in communication with the space 31 of the bottom part of the container 3, and a juice outlet 33 is disposed on the flow control valve 32. A reflux opening 34 is formed on an upper half part of the container 3, a handle 35 is disposed on a side of the container 3, a channel 36 is formed inside the handle 35, a top end of the channel 36 is connected to the reflux opening 34 of the upper half part of the container 3, and a bottom end of the channel 36 is connected to the space 31 of the bottom part of the container 3, so that the reflux opening 34 is in communication with the space 31 of the bottom part of the container 3.

The cutlery 4 is positioned on the bottom part of the container 3, connected to the mandrel 22 of the operating motor 21, and used for rotating to mash food, vegetables and fruits placed inside the container 3. In the implementation, the cutlery 4 may be an independent blade group for cutting, or an independent millstone group for grinding. In this embodiment, the cutlery 4 preferably includes a cutting blade 41, a first millstone 42 and a second millstone 43. The cutting blade 42 and the second millstone 43 positioned in a top-down sequence are coaxially connected to the mandrel 22, and the cutting blade 41 protrudes above the second millstone 43. The first millstone 42 is annular-shaped, and fixed to the bottom part of the container 3, and an annular bottom surface of the first millstone 42 faces the space 31 of the bottom part of the container 3, and has a plurality of lower grinding teeth 421 disposed thereon. The second millstone 43 is disk-shaped, and a plurality of upper grinding teeth 431 is disposed on a peripheral top surface of the second millstone 43 corresponding to the plurality of lower grinding teeth 421.

In addition, a bottom part of the second millstone 43 forms an upper conical plate 432 protruding downwards, a lower conical plate 433 is disposed below the upper conical plate 432, the upper and lower conical plates (432, 433) are located inside the space 31 of the bottom part of the container 3, and a space 434 with a conical section is formed between a conical surface of the lower conical plate 433 and a conical surface of the upper conical plate 432. The upper conical plate 432 and the lower conical plate 433 jointly form a pressurizing mechanism 5.

Figure 2:
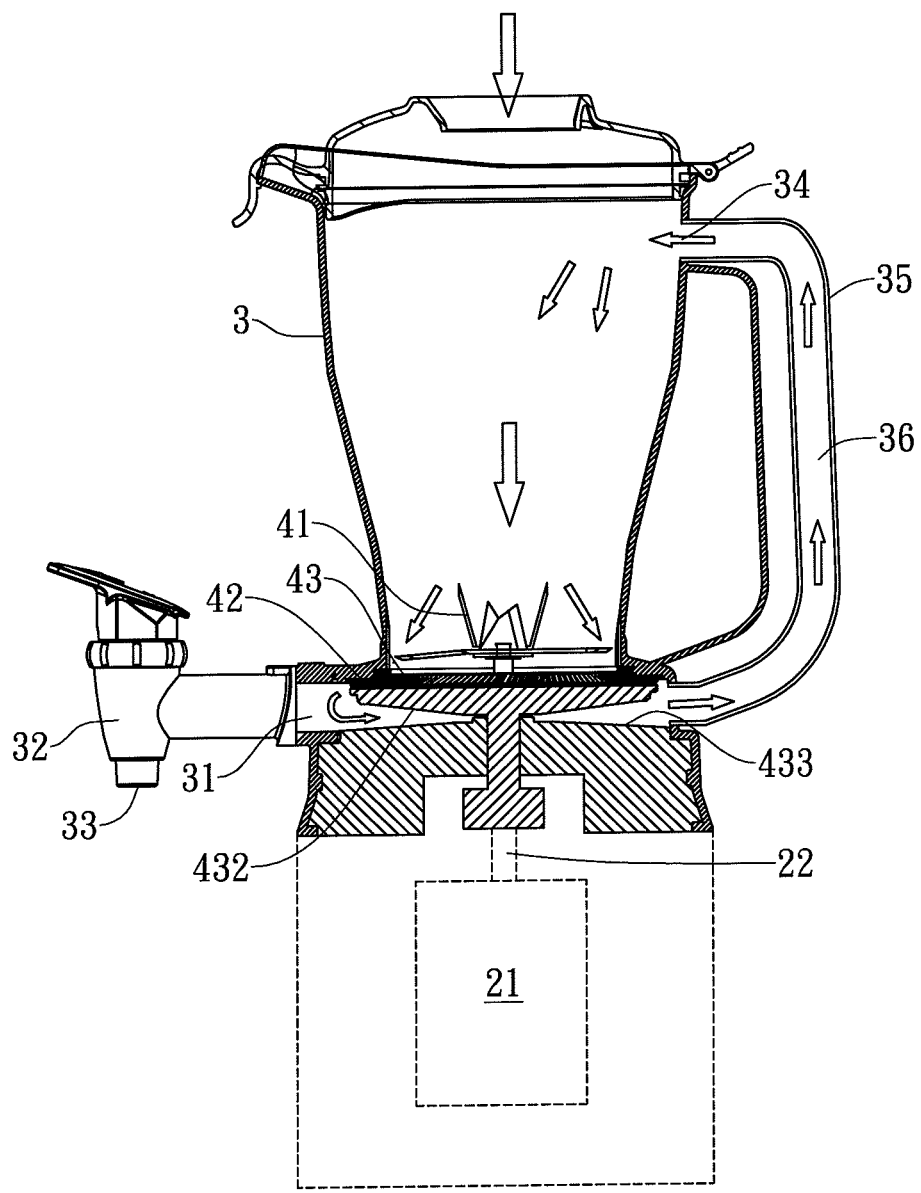
FIG. 2 is a using state diagram of the present invention.

Thereby, as shown in FIG. 2, when a user places food, vegetables and fruits in the container 3, and at the same time activates the operating motor 21 to enable the operating motor 21 to start operating, the mandrel 22 of the operating motor 21, the second millstone 43 and the cutting blade 41 rotate synchronously, so that the food, vegetables and fruits in the container 3 are cut by the cutting blade 41, and ground by the first millstone 42 and the second millstone 43; after the flow control valve 32 is opened, juice, particles and fibers of the food, vegetables and fruits flow out downward via the juice outlet 33.

When the flow control valve 32 is closed, the space 31 of the bottom part of the container 3 is in an enclosed state. As the upper conical plate 432 rotates to produce a pressurizing effect together with the lower conical plate 433, the juice, particles and fibers of the food or vegetables and fruits inside the enclosed space 31 of the bottom part of the container 3 may be pressurized, so that the juice, particles and fibers of the food or vegetables and fruits flow upwards through the reflux opening 34 of the upper half part of the container 3 via the channel 36 inside the handle 35, and are mixed with the uncut or cut food, vegetables and fruits inside the container 3, to perform circulating cutting and grinding, to make the particles and fibers of the food, vegetables and fruits finer for being easily absorbed by human bodies.

In the implementation, the pressurizing mechanism 5 may also be a pressurizing pump, in which the pressurizing pump is in communication with the space 31 of the bottom part of the container 3, and may also pressurize the juice, particles and fibers of the food or vegetables and fruits inside the space 31 of the bottom part of the container 3, so as to perform circulating cutting and grinding.

Therefore, the present invention has the following advantages.

1. The mandrel of the operating motor, the second millstone and the cutting blade of the present invention may rotate synchronously at a low speed, so that the food, vegetables and fruits not only can be cut and ground sequentially, but can also be decomposed into water-soluble fibers, thereby preserving nutrients of the food by preventing oxidization.

2. The mandrel of the operating motor, the second millstone and the cutting blade of the present invention are driven by an induction servo motor with a low rotating speed, the induction servo motor a power consumption of about 80-250 W, and a life of about 20,000 hours, while a conventional carbon brush motor that rotates at a high speed has a power consumption of about 800-1000 W, and a life of about 500 hours. Therefore, the present invention can not only save the energy, avoid the energy waste and increase the service life, but also effectively reduce noises by lowering the rotating speed.

3. Through the present invention, repeated cutting and grinding may be performed on the food, vegetables and fruits, so that not only the cutting and grinding efficiency is increased effectively, but also the particles and fibers of the ground food, vegetables and fruits are made finer for being easily absorbed by human bodies.

4. Through the present invention, the flow control valve may be closed after usage to clean the channel inside the handle and the components, and then the flow control valve may be opened to allow water to flow out after cleaning. Therefore, cleaning can be easily carried out without disassembling the components, so as to effectively save the disassembly and cleaning time.

In view of the above, according to the aforementioned disclosure, the present invention surely can achieve the anticipated objects to provide a circulating processor, which can perform repeated mashing treatment on food, vegetables and fruits to increase the efficiency make the particles and fibers of the mashed food, vegetables and fruits finer for being easily absorbed by human bodies, and can be cleaned easily after usage. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A circulating processor, comprising:
a base, having an operating motor disposed therein, wherein a mandrel is disposed in the operating motor;
a container, disposed above the base, wherein a space is formed on a bottom part of the container, a reflux opening is formed on an upper half part of the container, and the reflux opening is in communication with the space of the bottom part of the container;
a cutlery, positioned on the bottom part of the container, connected to the mandrel of the operating motor, and for rotating to mash food, vegetables and fruits placed inside the container; and
a pressurizing mechanism, in communication with the space of the bottom part of the container, for pressurizing to transfer the mashed food, vegetables and fruits into the container via the reflux opening of the upper half part of the container, so as to perform circulating mashing treatment.

2. The circulating processor according to claim 1, wherein, the cutlery comprises a cutting blade, a first millstone and a second millstone corresponding to the first millstone, the cutting blade, the second millstone and the mandrel are coaxially connected, and the cutting blade protrudes above the second millstone.

3. The circulating processor according to claim 2, wherein, a flow control valve is disposed on a side of the bottom part of the container, and the flow control valve is in communication with the space of the bottom part of the container, and used for controlling the space to be in communication with or separated from the outside of the container.

4. The circulating processor according to claim 2, wherein, the pressurizing mechanism is an upper conical plate formed below the cutlery and protruding downwards.

5. The circulating processor according to claim 4, wherein, the pressurizing mechanism further comprises a lower conical plate located below the upper conical plate, and a space with a conical section is formed between a conical surface of the lower conical plate and a conical surface of the upper conical plate.

6. The circulating processor according to claim 2, wherein, the first millstone is annular-shaped, the first millstone is fixed to the bottom part of the container, a plurality of lower grinding teeth is disposed on an annular bottom surface of the first millstone, and a plurality of upper grinding teeth is disposed on a top surface of the second millstone corresponding to the plurality of lower grinding teeth.

7. The circulating processor according to claim 6, wherein, a flow control valve is disposed on a side of the bottom part of the container, and the flow control valve is in communication with the space of the bottom part of the container, and used for controlling the space to be in communication with or separated from the outside of the container.

8. The circulating processor according to claim 6, wherein, the pressurizing mechanism is an upper conical plate formed below the cutlery and protruding downwards.

9. The circulating processor according to claim 8, wherein, the pressurizing mechanism further comprises a lower conical plate located below the upper conical plate, and a space with a conical section is formed between a conical surface of the lower conical plate and a conical surface of the upper conical plate.

10. The circulating processor according to claim 1, wherein, a handle is disposed on a side of the container, a channel is formed inside the handle, a top end of the channel is connected to the reflux opening of the upper half part of the container, and a bottom end of the channel is connected to the space of the bottom part of the container.

11. The circulating processor according to claim 10, wherein, a flow control valve is disposed on a side of the bottom part of the container, and the flow control valve is in communication with the space of the bottom part of the container, and used for controlling the space to be in communication with or separated from the outside of the container.

12. The circulating processor according to claim 10, wherein, the pressurizing mechanism is an upper conical plate formed below the cutlery and protruding downwards.

13. The circulating processor according to claim 12, wherein, the pressurizing mechanism further comprises a lower conical plate located below the upper conical plate, and a space with a conical section is formed between a conical surface of the lower conical plate and a conical surface of the upper conical plate.

14. The circulating processor according to claim 1, wherein, a flow control valve is disposed on a side of the bottom part of the container, and the flow control valve is in communication with the space of the bottom part of the container, and used for controlling the space to be in communication with or separated from the outside of the container.

15. The circulating processor according to claim 1, wherein, the pressurizing mechanism is an upper conical plate formed below the cutlery and protruding downwards.

16. The circulating processor according to claim 15, wherein, the pressurizing mechanism further comprises a lower conical plate located below the upper conical plate, and a space with a conical section is formed between a conical surface of the lower conical plate and a conical surface of the upper conical plate.

* * * * *